(12) United States Patent
Godin et al.

(10) Patent No.: US 8,571,555 B2
(45) Date of Patent: Oct. 29, 2013

(54) METHOD AND APPARATUS FOR HANDOVER BY IMPLEMENTING PRE-HANDOVER INDICATION MESSAGES FOR A PREFERRED TARGET NODE IN WIRELESS TELECOMMUNICATION NETWORKS

(75) Inventors: Philippe Godin, Viroflay (FR); Sudeep Kumar Palat, Grange Park (GB)

(73) Assignee: Alcatel Lucent, Paris (FR)

( * ) Notice: Subject to any disclaimer, the term of this patent is extended or adjusted under 35 U.S.C. 154(b) by 922 days.

(21) Appl. No.: 12/221,723

(22) Filed: Aug. 6, 2008

(65) Prior Publication Data

US 2009/0047965 A1  Feb. 19, 2009

(30) Foreign Application Priority Data

Aug. 14, 2007  (EP) .................................. 07291016
Dec. 26, 2007  (EP) .................................. 07291624

(51) Int. Cl.
*H04W 36/00* (2009.01)
(52) U.S. Cl.
USPC ........ 455/436; 455/420; 455/552.1; 455/437; 455/438; 455/440; 455/442; 455/444; 455/422.1; 370/328; 370/331; 370/332; 370/341
(58) Field of Classification Search
USPC ........ 455/432.1–453, 509, 420–422.1, 552.1, 455/456.1, 404.2, 429; 370/338, 324, 370/328–332, 341, 350
See application file for complete search history.

(56) References Cited

U.S. PATENT DOCUMENTS

| | | | | |
|---|---|---|---|---|
| 2005/0197124 | A1* | 9/2005 | Kang et al. | 455/439 |
| 2007/0047512 | A1  | 3/2007 | Zhang et al. | 370/343 |
| 2007/0117563 | A1* | 5/2007 | Terry et al. | 455/434 |
| 2008/0299973 | A1* | 12/2008 | Sayeedi | 455/436 |

FOREIGN PATENT DOCUMENTS

| | | |
|---|---|---|
| EP | 1 571 786 A | 9/2005 |
| WO | WO 2007/078051 A | 7/2007 |
| WO | PCT/EP2008/006178 | 12/2008 |

OTHER PUBLICATIONS

Alcatel: "Proffer/Bid based Handover Preparation", Internet Citation [Online], Aug. 28, 2006, Retrieved from the Internet: URL: Tallin, Estonia, httb://www.3gpp.org/ftp/tsg%5Fran/WG2%5FRL2/TSGR2%5F54/Documents>, 3 pages.

(Continued)

*Primary Examiner* — Vladimir Magloire
*Assistant Examiner* — Barbar Sarwar
(74) *Attorney, Agent, or Firm* — Fay Sharpe, LLP

(57) ABSTRACT

A method for handover of a mobile terminal from a source node to a target node in a wireless telecommunications network, including the steps of: adding an indication in the preparation phase by which source node indicates to the target node if it is the one preferred or not. If a target node is not the one preferred but is still selected by the UE, it may indicate this to the source node as by a specific new message that comes earlier in the handover process than a message requesting the source node to release resources following successful handover to a new node. The source node can then in this case cancel handover preparations to other target nodes earlier and also start data forwarding where applicable earlier.

9 Claims, 5 Drawing Sheets

(56) References Cited

OTHER PUBLICATIONS

Alcatel-Lucent: "Impact of Multiple handover preparations on RAN3 specifications", 3GPP TSG RAN WG3 #57, R3-071440, [Online], Aug. 24, 2007, Retrieved from the Internet: URL:http:...www.3gpp.org/ftp/tsg_ran/WG3_Iu/TSGR3_57/docs/>, pp. 1-9.

Huawei: "Multiple preparations of eNBs" 3GPP TSG RAN WG3 #57BIS, R3-071943, [Online] Oct. 8, 2007, Retrieved from the Internet: URL:http://www.3gpp.org/ftp/tsg_ran/WG3_Iu/TSGR3_57bis/docs/>, pp. 1-9.

* cited by examiner

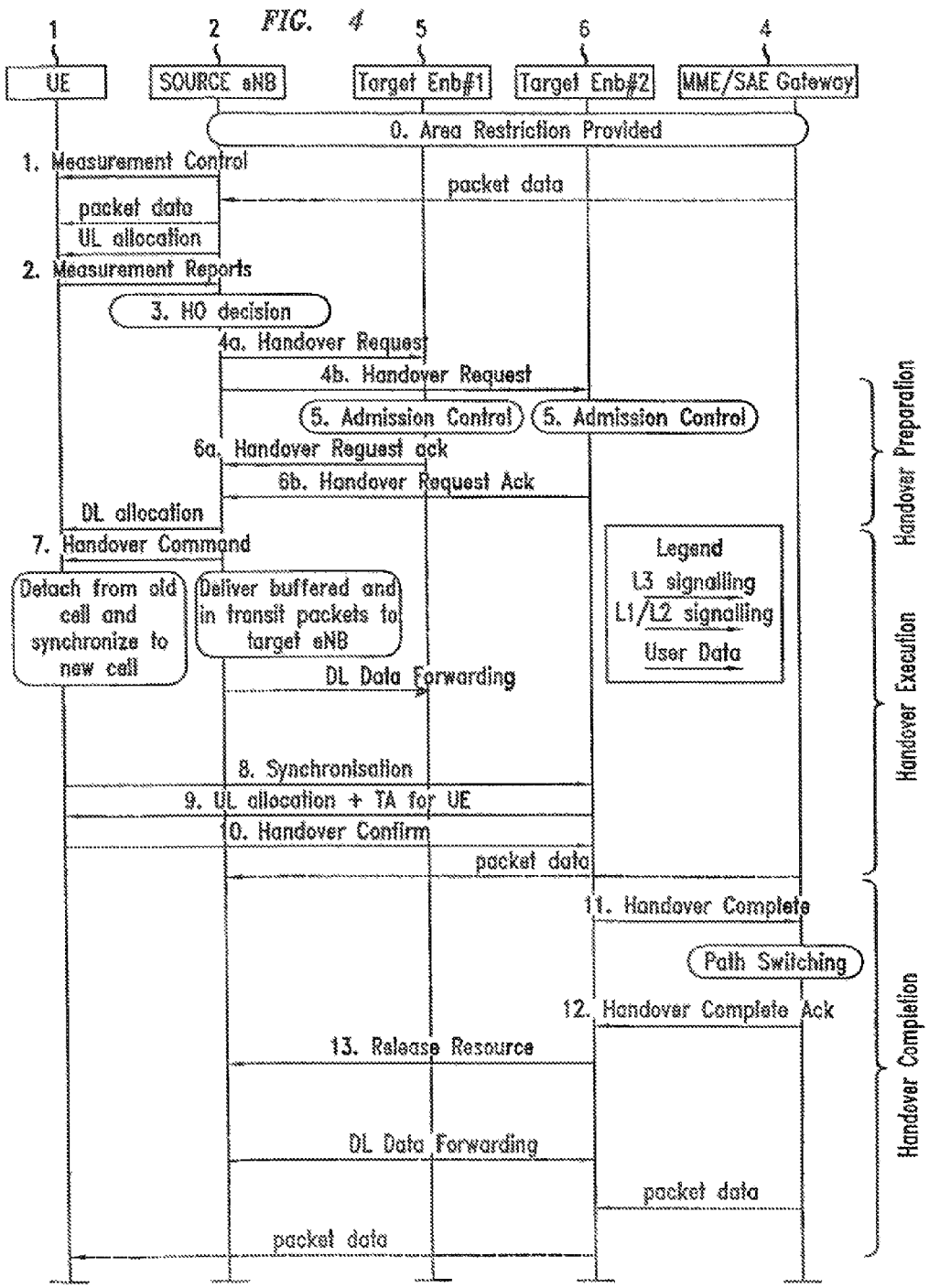

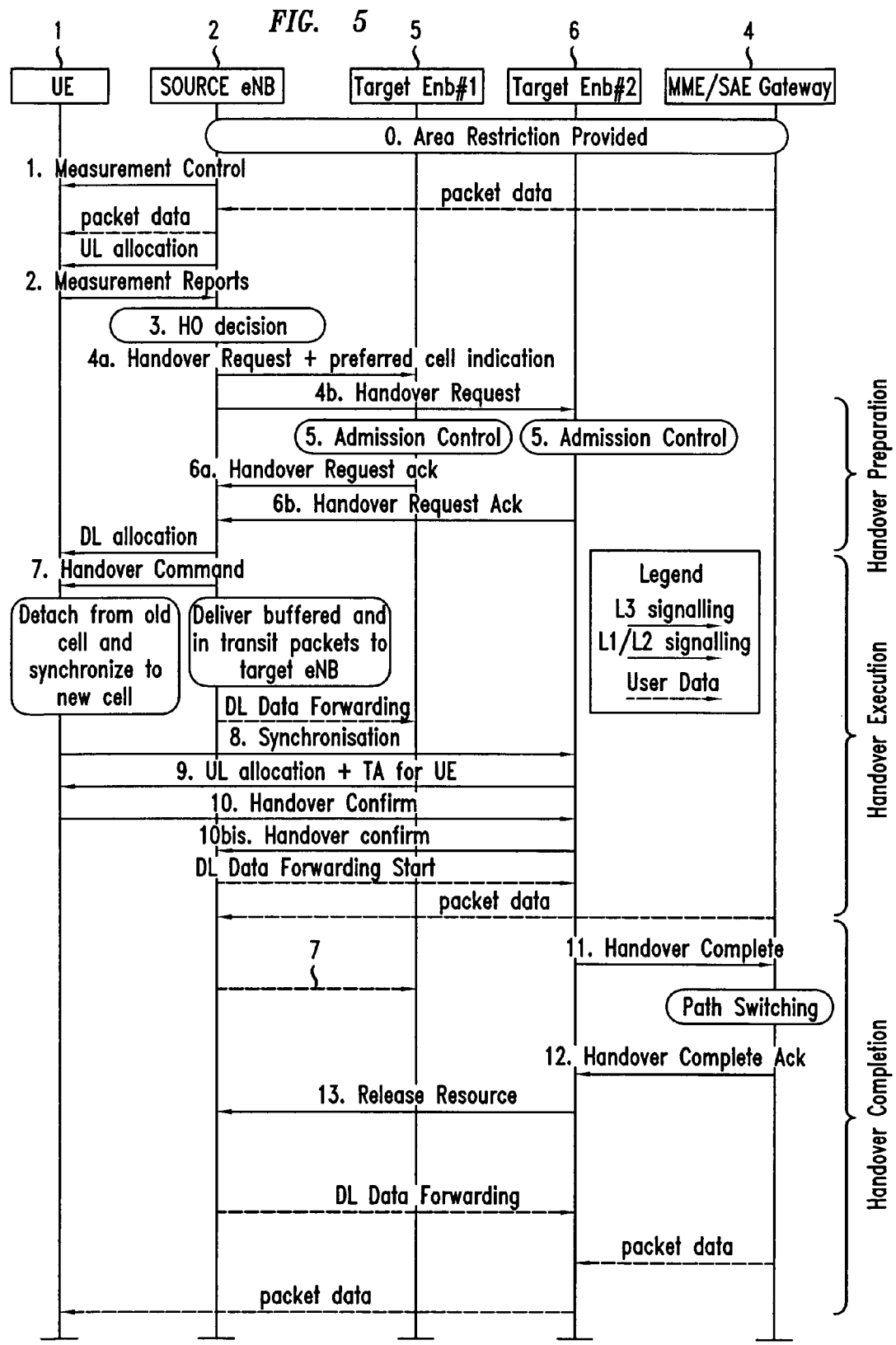

METHOD AND APPARATUS FOR HANDOVER BY IMPLEMENTING PRE-HANDOVER INDICATION MESSAGES FOR A PREFERRED TARGET NODE IN WIRELESS TELECOMMUNICATION NETWORKS

FIELD OF THE INVENTION

The present invention relates to a method and apparatus for handover in a wireless telecommunications network, and more particularly, but not exclusively, to a method and apparatus implemented in accordance with the 3rd Generation Partnership Project (3GPP) evolved Universal Terrestrial Radio Access Network (E-UTRAN) and evolved Universal Terrestrial Radio Access (E-UTRA) specifications.

BACKGROUND OF THE INVENTION

Currently, 3GPP is considering development of E-UTRA and E-UTRAN as set out in the technical specification 3GPP TS 36.300 v 8.1.0 (2007-06), incorporated herein by way of reference, and related documents. 3GPP Long Term Evolution (LTE) aims to enhance the Universal Mobile Telecommunications System (UMTS) standard, for example, by improving efficiency and services.

In E-UTRAN, user equipment (UE) communicates with a network node, NodeB (eNB), with data being sent on radio bearers (RBs) over a radio link between them. The eNB interfaces with a Mobile Management Entity/System Architecture Evolution Gateway (MME/SAE GW) via an interface designated as S1. An E-UTRAN network includes a plurality of eNBs and MME/SAE GWs.

In LTE, all the Radio Access Network (RAN) functions are integrated in each node, eNB. Downlink user data, that is Internet Protocol (IP) packets, are transmitted from the SAE GW to the eNB. As the UE is handed over from a first, source, eNB to second, target, eNB, the SAE GW is updated with the second eNB address and the SAE GW starts to send data to that target eNB.

However, to avoid data loss, any data that is already buffered in the source eNB must be forwarded to the target eNB. Also, data that has been sent to the source eNB during the handover (HO) procedure, before the SAE GW is updated with the new eNB address, is also forwarded by the source eNB to the target eNB.

To preserve the order of packets sent to the UE, the target eNB must strive to send data over the radio in the same order as sent by the SAE GW. That is, first data buffered by the eNB is sent to the target eNB, followed by data in transit from the SAE GW during the HO process, and only when these have all been sent should the target eNB send to the UE fresh data that it receives directly from the SAE GW.

The message flow for the HO process applied to a UE 1 is shown in FIG. 1, which illustrates a network including a source eNB 2, a target eNB 3 and an MME/SAE GW 4. When the source eNB 2 makes a handover decision based on measurement reports from the UE 1, it sends a Handover Request message, at step 4, to the target eNB 3. At the Admission Control step 5, the target eNB 3 configures the required resources and sends a Handover Request Acknowledge message, at step 6, to the source eNB 2. Following the Handover Command, at step 7, from the source eNB 2 to the UE 1, the UE 1 detaches from the old cell and synchronises to the new cell associated with the target eNB 3. Also, data packets buffered at the source eNB 2 and any in transit are forwarded to the target eNB 3 from the source eNB 2. Following the Handover Confirm message at step 10 from the UE 1 to the target eNB 3, a Handover Complete message, at step 11, is sent to the MME/SAE GW 4 by the target eNB 3. Data packets from the source eNB 2 continue to be delivered to the target eNB 3. Once all the forwarded data from source eNB 2 has been received by the target eNB 3, the target eNB 3 can then send to the UE 1 fresh data arriving over S1 from MME/SAE GW.

In LTE, the data forwarding phase, where data is sent to the target eNB from the source eNB, currently starts when the source eNB receives the Handover Request Ack message, at step 6 in FIG. 1, from the target eNB which indicates the end of the preparation phase for that target eNodeB.

However, it has recently been proposed that the source eNodeB 2 be able to trigger multiple preparation procedures towards several target eNodeBs 5 and 6, as shown in FIG. 2, where the same references are used for the same items. For the purposes of explanation, only two target eNBs are illustrated, but there may be more than two target eNBs available. The source eNB 2 sends Handover Request messages, at steps 4*a* and 4*b*, to the target eNBs 5 and 6. The source eNodeB 2 receives Handover Request Ack messages, shown at step 6*a* and step 6*b*, from each of the multiple target eNodeBs 5 and 6, but, at that time, does not know which of the target eNodeBs 5 and 6 will be finally selected as the one to which the UE 1 will hand over. The UE 1 will finally succeed in being handed over to only one of the target eNodeBs 5 and 6. Therefore, when the source eNodeB 2 receives the Handover Request Ack messages, at steps 6*a* and 6*b*, it does not know towards which of the target eNodeBs 5 and 6 it should trigger data forwarding.

There have been two previous proposals to deal with data forwarding where multiple target eNBs exist to ensure that the finally elected target eNodeB will receive the forwarded data.

In a first proposal, as shown in FIG. 3, the source eNodeB 2 triggers multiple data forwarding procedures towards all prepared target eNodeBs 5 and 6 from which it has received Handover Request Ack messages, at steps 6*a* and 6*b*. This approach is inefficient, cumbersome and bandwidth consuming, as it involves forwarding the data towards target eNodeBs which will not eventually be elected to form a connection with the UE.

In a second proposal, as shown in FIG. 4, the source eNodeB 2 triggers the data forwarding towards only a preferred target eNodeB 5 at the time it receives the Handover Request Ack messages at steps 6*a* and 6*b*. The preferred target eNB 5 may, for example, be that one having the highest probability of the UE 1 successfully handing over to it. The probability of success can be assessed in various ways, for example, based on channel quality. The manner in which a target eNB 5 is designated as the preferred target eNB depends on a particular implementation of a network. The source eNB 2 only triggers the data forwarding towards any other target eNodeB 6 if and when it gets an indication, on receipt of a Release Resource message at step 13, from that other non-preferred target eNodeB 6 that it has finally been selected by the UE 1. Thus, when one of the non-preferred target eNBs is finally selected, that indication to the source eNodeB 2 comes quite late in the handover process and makes the data forwarding process quite complex.

BRIEF SUMMARY

According to a first aspect of the invention, a method for handover of a mobile terminal from a source node to a target node in a wireless telecommunications network, includes the steps of: identifying a plurality of target nodes; identifying a preferred target node from the plurality for the mobile terminal to hand over to; and the source node indicating to the preferred target node that it is the preferred target node. A target node may be preferred, for example, because it is most likely to be the one to which the mobile terminal will successfully hand over, or because it involves the most efficient use of resources, or for some other reason, the designation process depending on how the network is implemented and its priorities. The method is applicable to networks implemented in accordance with Long Term Evolution, LTE, standards, but may also be used in other types of network where mobile terminals are connected to different nodes to achieve mobility, or between nodes of different technology types.

In one method in accordance with the invention, when a target node other than the preferred target node is chosen to connect to the mobile terminal, the chosen target node sends a message to the source node to inform it of the choice and, following receipt of the message, and before the source node is sent a request to release resources, the source node begins forwarding data to the chosen target node. This enables data forwarding to the actual node selected for connection to the mobile terminal, where that node is not the designated preferred node, to begin sooner than in the previous second proposal. Before the source node receives the message, it may forward data to the preferred target node. By forwarding data to the preferred node as soon as the source node receives a handover request acknowledgement message from it, the data forwarding remains optimally efficient in the vast majority of cases where the preferred target node becomes node selected by the mobile terminal.

In a method in accordance with the invention, when the preferred target node is selected to connect to the mobile terminal, no message is sent to the source node by the preferred target node to inform it of the selection before the source node is sent by this target node a request to release resources. This ensures that there is no significant additional signalling required to implement the invention.

In a method in accordance with the invention, the source node sends a handover request to the plurality of target nodes and includes an indication in the handover request which indicates the preferred target node. Alternatively, the preferred status of a node may be transmitted via a separate message additional to the handover request message, but this increases signalling overheads. In a method in accordance with the invention, the handover request message sent to the preferred target node includes an information element informing it that it is the preferred target node and the handover request messages sent to non-preferred target nodes do not include the information element. The handover request message may, for example, include a flag which is set to 'preferred' or 'non-preferred', or alternatively, the handover request message may include an information element only where the handover request message is sent to the preferred node, and any non-preferred node infers from its absence that it is not the preferred node.

In a method in accordance with the invention, when a target node other than the preferred target node is chosen to connect to the mobile terminal and the chosen target node sends a message to the source node to inform it of the choice, following receipt of the message, and before the source node is sent a request to release resources, the source node sends a Handover Cancel message to the preferred target node to cancel prepared context related to the mobile terminal and held by preferred target node. The source node may also send a Handover Cancel message to each other non-selected target node when it receives the message form the chosen target node informing it of the choice.

According to a second aspect of the invention, a wireless telecommunications network is arranged to implement the method in accordance with the invention.

BRIEF DESCRIPTION OF THE DRAWINGS

Some embodiments and methods in accordance with the invention are now described, by way of example only, and with reference to the accompanying drawings, in which:

FIGS. 1 to 4 schematically illustrate prior art networks and messaging during handover; and FIG. 5 schematically illustrates a network and messaging during handover in accordance with the invention.

DETAILED DESCRIPTION

With reference to FIG. 5, when measurement reports from the UE 1 indicate to the source eNB 2 that the UE 1 should hand over to another eNB, it sends a Handover Request message, at steps 4a and 4b, to multiple target eNBs 5 and 6. One of the target eNBs is designated by the source eNB 2 as the preferred target eNB, for example, because it is most likely to be the one to which the UE 1 will successfully hand over, or because it involves the most efficient use of resources, or for some other reason, the designation process depending on how the network is implemented. The Handover Request message sent at step 4a to the preferred eNB 5 also includes an indication that it is the preferred eNB. The indication is an additional information element included in the message. The Handover Request message to the other target eNBs, at step 4b, does not include any indication that they are preferred.

Following receipt of the Handover Ack messages at steps 6a and 6b from preferred and non-preferred eNBs 5 and 6, the source eNB 2 begins forwarding data to the preferred eNB 5.

Figure 1:
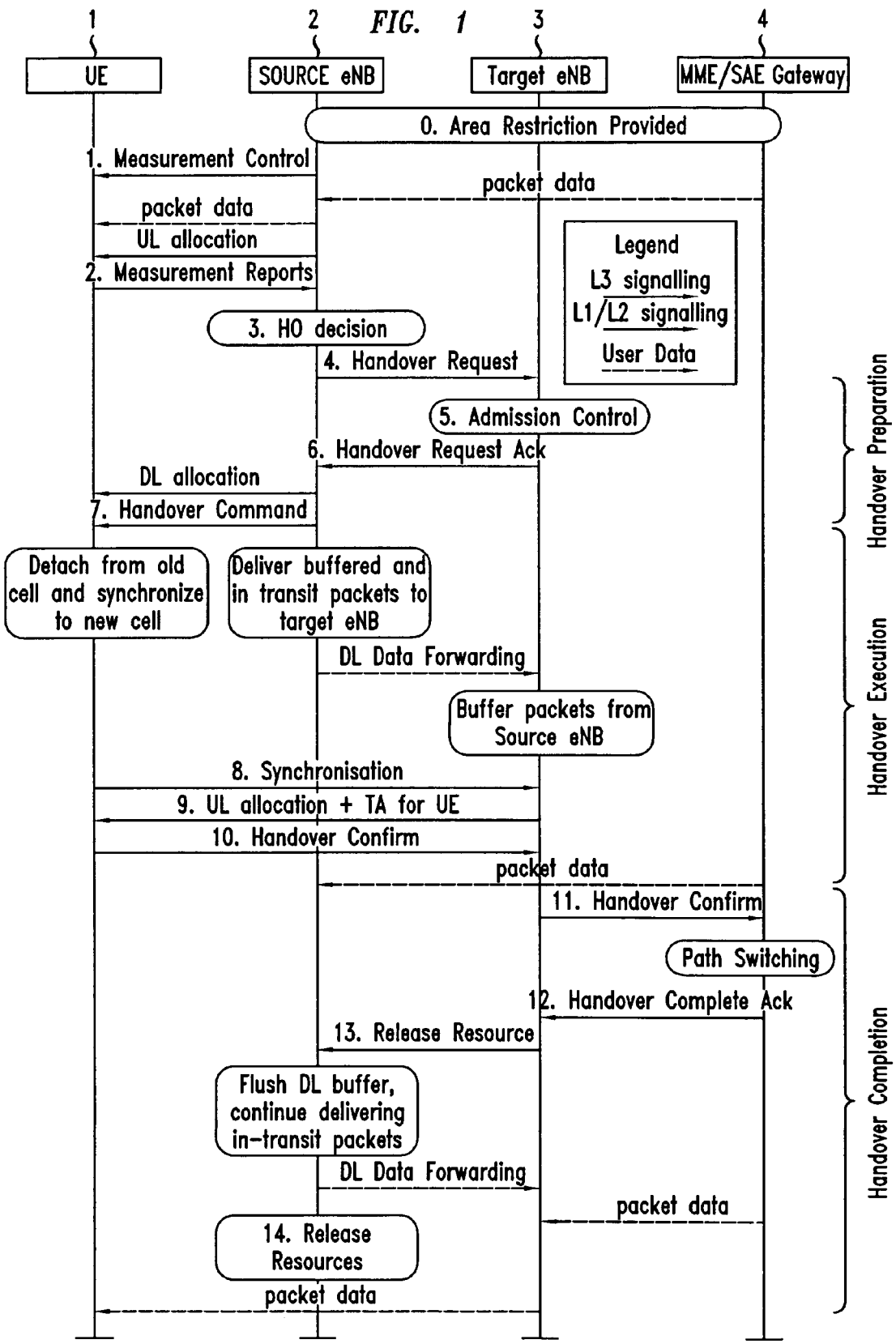
Figure 2:
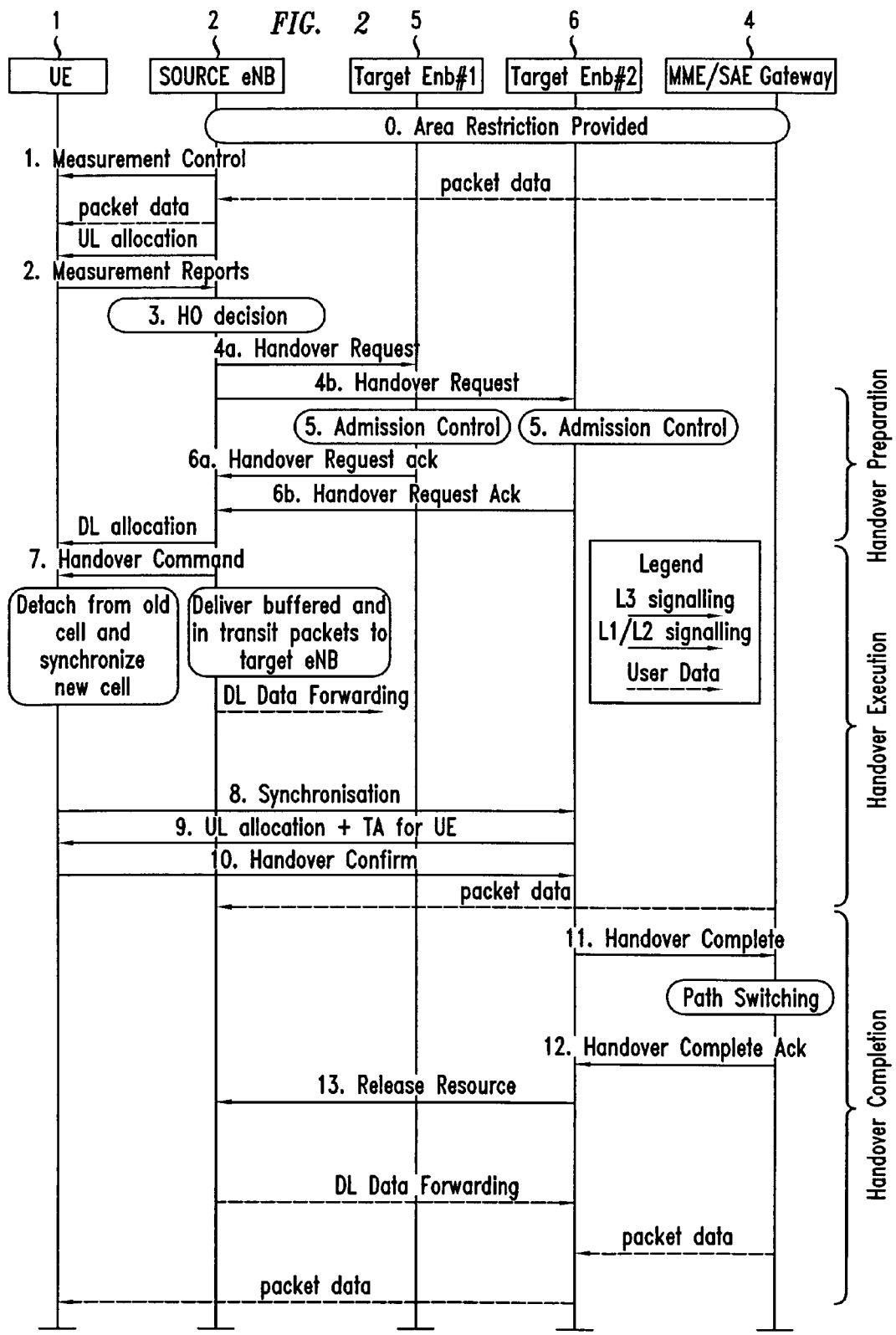
Figure 3:
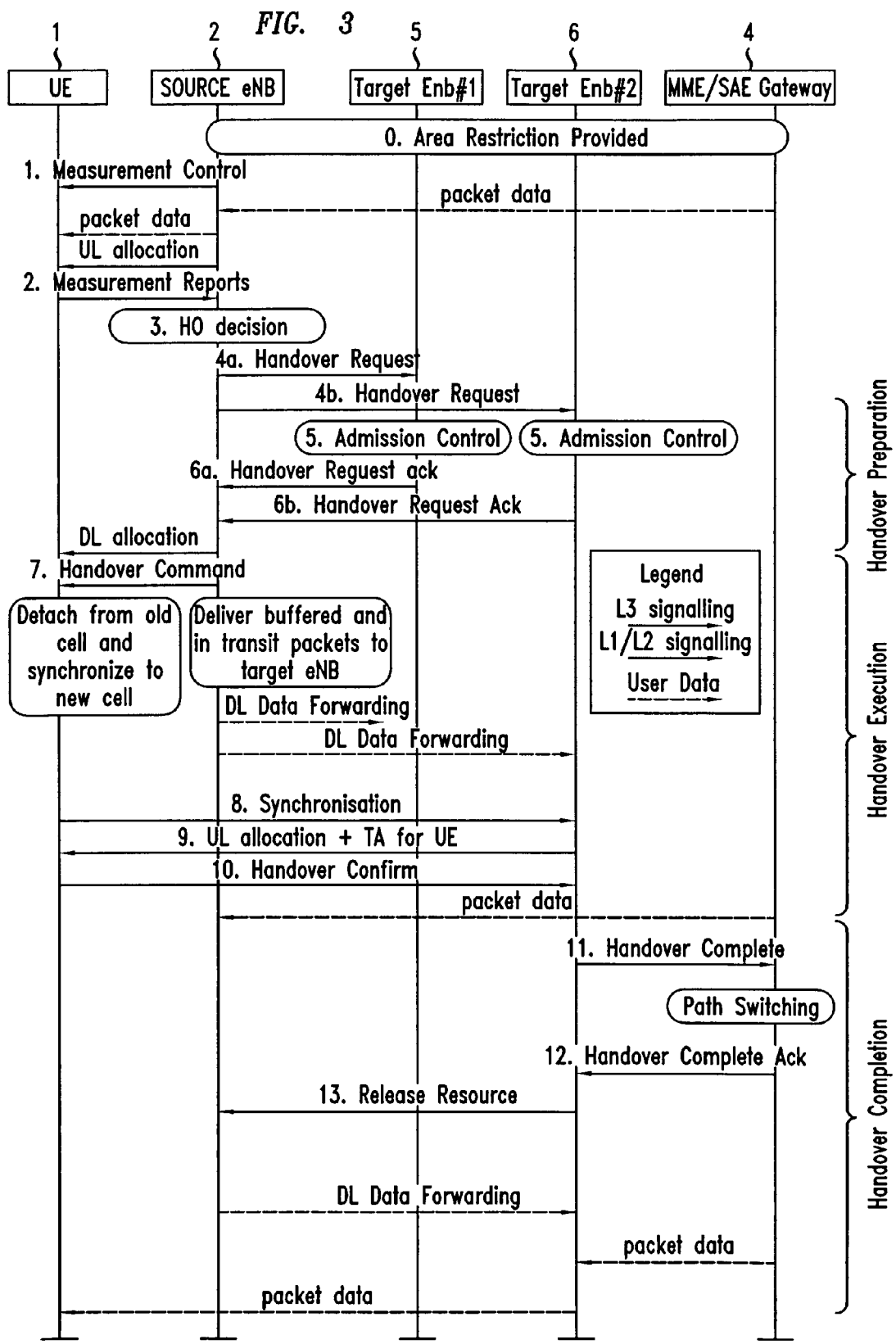

In most cases, the UE 1 will then attach to the preferred eNB 5, and the handover procedure will continue as set out in FIG. 1. However, where instead the UE 1 establishes a connection with a non-preferred eNB 6, as shown in FIG. 5, and sends a Handover Confirm message, at step 10, to the non-preferred target eNB 6, the eNB 6 then sends a new Handover Confirm message, at step 10bis, to the source eNB 2. Immediately after receiving the Handover Confirm message 10bis, the source eNB 2 then stops data forwarding to the preferred eNB 5 and begins to send data to the selected target eNB 6 chosen by the UE 1. Thus, data begins to be forwarded to the elected target eNB 6 before the source eNB 2 receives a Release Resource message, at step 13.

The information element in the Handover Request message, at step 4, indicates to the target eNodeB if it is preferred or not in this handover. Thus, if the eNB 5 is preferred, it never sends the new message, at step 10bis, when it becomes selected by the UE 1. Therefore, the new message 10bis is only sent when a non-preferred target eNodeB 6 is selected by the UE 1, which means in fewer cases. This improves the bandwidth occupancy, for example, without increasing the signalling load.

In addition, an optional, but advantageous procedure, is to cancel the context prepared in the preferred eNodeB 5 as soon as possible in cases where a non-preferred eNodeB 6 is selected by the UE 1. This is done, in one method in accordance with the invention, by the source eNodeB 2 sending a Cancel message, shown as chain broken line 7, to the preferred target eNodeB 5 as soon as receiving the new message 10bis. Alternatively, no Cancel message is sent and reception of the Release Resource message at step 13 is used to cancel the prepared context. Furthermore, after the source eNB 2 receives message 10bis, it may send Cancel messages to other non-selected, non-preferred target eNBs to immediately cancel pending prepared contexts that they hold.

The present invention may be embodied in other specific forms and implemented in other methods without departing from its spirit or essential characteristics. The described embodiments and methods are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method for handover of a mobile terminal from a source node to a target node in a wireless telecommunications network, including the steps of:
    identifying a plurality of target nodes;
    identifying a preferred target node from the plurality for the mobile terminal to hand over to;
    the source node indicating to the preferred target node that it is the preferred target node; and
    when a target node other than the preferred target node is selected by the mobile terminal as a chosen target node to connect to the mobile terminal, the chosen target node sending a message to the source node to inform the source node of the choice;
    and, before the source node receives said message, the source node forwarding data to the preferred target node and, following receipt of said message by the source node and before the source node is sent a request to release resources, the source node beginning to forward data to the chosen target node.

2. The method as claimed in claim 1 and wherein, when the preferred target node is selected to connect to the mobile terminal, no message is sent to the source node by the preferred node to inform it of the selection before the source node is sent a request to release resources.

3. The method as claimed in claim 1 and wherein the source node sends a handover request to the plurality of target nodes and includes an indication in the handover request which indicates which node is the preferred target node and which node is not the preferred target node.

4. The method as claimed in claim 3 and wherein the handover request message sent to the preferred target node includes an information element informing it that it is the preferred target node and the handover request messages sent to non-preferred target nodes do not include the information element.

5. The method as claimed in claim 1 and, when a target node other than the preferred target node is chosen to connect to the mobile terminal and the chosen target node sends a message to the source node to inform it of the choice, following receipt of the message, and before the source node is sent a request to release resources, the source node sends a handover cancel message to the preferred target node to cancel prepared context related to the mobile terminal and held by the preferred target node.

6. The method as claimed in claim 5 and wherein the source node sends a handover cancel message to each non-selected target node when it receives the message from the chosen target node informing it of the choice.

7. The method as claimed in claim 1 and implemented in accordance with Long Term Evolution, LTE, standards.

8. A wireless telecommunications network comprising a plurality of nodes and being arranged that, during handover of a mobile terminal from a source node to a target node, a plurality of target nodes are identified and a preferred target node is identified from the plurality for the mobile terminal to hand over to; and the source node indicates to the preferred target node that it is the preferred target node; and
    when a target node other than the preferred target node is selected by the mobile terminal as a chosen target node to connect to the mobile terminal, the chosen target node sends a message to the source node to inform the source node of the choice;
    and, before the source node receives said message, the source node forwards data to the preferred target node and, following receipt of said message by the source node and before the source node is sent a request to release resources, the source node begins to forward data to the chosen target node.

9. A base station for a wireless telecommunications network, wherein:
    the base station is configured to identify a plurality of potential target nodes for an outgoing handover, in the event of a handover decision by a mobile terminal served by the base station;
    the base station is configured to select a preferred target node from the plurality and to communicate the selection to the selected preferred target node;
    the base station is configured to trigger a transmission of a message of a first kind in the event that the base station is not selected as a preferred target node for an incoming handover but is selected as an actual target node for an incoming handover;
    a message of the first kind is a message from a selected target node to a source node, informing the source node of the selection;
    the base station is configured, in the event that it becomes a source node, to forward data to a preferred target node prior to receiving a message of the first kind from any target node; and
    the base station is configured, after receiving a message of the first kind from a selected target node but before receiving a request to release resources, to begin forwarding data to the selected target node.

* * * * *